(12) United States Patent
Zhang

(10) Patent No.: US 10,795,145 B2
(45) Date of Patent: Oct. 6, 2020

(54) INFRARED AND NIGHT VISION PIXEL BY PIXEL OPTICAL FUSION SYSTEM

(71) Applicant: ULSee Inc., Taipei (TW)

(72) Inventor: Evan Y. W. Zhang, Hangzhou (CN)

(73) Assignee: ULSee Inc., Taipei (TW)

( * ) Notice: Subject to any disclaimer, the term of this patent is extended or adjusted under 35 U.S.C. 154(b) by 64 days.

(21) Appl. No.: 15/793,164

(22) Filed: Oct. 25, 2017

(65) Prior Publication Data
US 2019/0121115 A1 Apr. 25, 2019

(51) Int. Cl.
| G02B 23/04 | (2006.01) |
| H04N 5/33 | (2006.01) |
| G02B 23/12 | (2006.01) |
| G02B 5/20 | (2006.01) |
| G02B 5/26 | (2006.01) |
| G02B 27/10 | (2006.01) |
| G02B 27/14 | (2006.01) |
| G02B 13/14 | (2006.01) |

(52) U.S. Cl.
CPC ............. *G02B 23/04* (2013.01); *G02B 5/208* (2013.01); *G02B 5/26* (2013.01); *G02B 23/12* (2013.01); *G02B 23/125* (2013.01); *G02B 27/1006* (2013.01); *G02B 27/1066* (2013.01); *G02B 27/141* (2013.01); *H04N 5/33* (2013.01); *G02B 13/14* (2013.01)

(58) Field of Classification Search
None
See application file for complete search history.

(56) References Cited

U.S. PATENT DOCUMENTS

| 7,842,921 | B2 | 11/2010 | Reed et al. | |
| 2004/0148063 | A1* | 7/2004 | Patchell | B60T 17/22 701/1 |
| 2006/0061856 | A1* | 3/2006 | Voigt | G02B 23/04 359/366 |
| 2006/0291849 | A1* | 12/2006 | Shamir | G03B 7/08 396/334 |
| 2013/0038626 | A1* | 2/2013 | Feda | G06T 5/007 345/617 |

* cited by examiner

*Primary Examiner* — Lindsay J Uhl
(74) *Attorney, Agent, or Firm* — Alan D. Kamrath; Karin L. Williams; Mayer & Williams PC

(57) ABSTRACT

Infrared and night vision optical fusion systems are provided. The first scheme is to add a common-aperture beam splitter in front of the night vision device, which is a band-pass filter having a high transmission for the light with wavelength of 0.78-1 μm, and a high reflectivity for the visible light with wavelength of 0.38-0.78 μm and for the infrared light with wavelength of 8-14 μm. After electrical processing, a target image with a temperature higher or lower than a certain threshold is obtained on the LCD/OLED. The second scheme is to align the night vision objective lens and the infrared objective lens having the same field of view side by side. Since only infrared targets having a temperature above or below a certain threshold are used, white or red humans, animals and vehicles can be clearly seen in a green night vision background with high contrast no matter which scheme is adopted.

5 Claims, 5 Drawing Sheets

INFRARED AND NIGHT VISION PIXEL BY PIXEL OPTICAL FUSION SYSTEM

FIELD OF THE DISCLOSURE

The present disclosure relates to infrared and night vision optical fusion systems, and more particularly to pixel by pixel optical fusion systems.

BACKGROUND OF THE INVENTION

Please refer to FIG. 1. FIG. 1 is a schematic diagram showing a picture-in-picture image displayed by a night vision device and an infrared thermal imager. Current night vision devices have a high resolution and a high sensitivity, however, the photomultiplier tube of the night vision device emits a green light, its contrast is very low when the night vision device is used in the wild since trees and grass are green color, and the paint of the military car 003a and the clothing of the solider 002a are also green color. But the contrast of the infrared thermal imager is very good in this situation. For example, the military car 003b and the solider 002b can be clearly seen in FIG. 1, since the temperatures of the military car and the solider are higher than the temperatures of trees and the grass. On the contrary, in the desert and other high temperature areas, the environment temperature is almost the same as or even higher than the body temperature of human and animals, and thus the contrast of the infrared thermal imager is not good in this situation since the infrared thermal imager forms an image relying on the temperature difference. Since there are few green trees and grass in the desert and the night vision device is not sensitive to temperature, the night vision device has a good contrast in the desert. The night vision device and the infrared thermal imager have their own advantages and disadvantages, and thus those skilled in the art would like to combine them to be used in any situation or any environment. The night vision image is an optical image, but the infrared image is an electronic image. If the night vision image is converted from an optical image into an electronic image, millions of fibers are required to be connected from the photomultiplier tubes to CCD in order to achieve ICCD, which is too expensive and complex, and is obviously not desirable. Another way is to convert the infrared image into an optical image, only an LCD is required, so that a pixel by pixel optical fusion is performed on the images. One requirement for performing the pixel by pixel optical fusion is that: the main bodies of the night vision device and the infrared thermal imager cannot be changed, therefore, current night vision devices and infrared thermal imagers can also be used. But this is not an easy thing, and this issue is not resolved yet.

Common means can be divided into front-end fusion or back-end fusion. Please refer to FIG. 2. FIG. 2 is a diagram showing a back-end fusion scheme. The infrared light emitted from a target object 120 is reflected by a first beam splitter 124 to a focal plane 171, processed by the processing unit 172, and displayed by the display unit 175. Then the image is reflected by the second beam splitter 325, and the reflected infrared light and the night vision light passing through the second beam splitter 325 pass through the lens 335 together to form a pixel by pixel fused image on the retina 338. In practice, most night vision devices do not have enough space to accommodate the second beam splitter 325, if insert the second beam splitter 325, the night vision device must be modified that is not desirable, so most of them still adopt a front-end fusion scheme. For example, the US front injection technology projects the infrared LCD image to a reflective mirror in front of the objective lens of the night vision device to be entered into the field of view of the night vision device, and then these two images are mixed together to form an image onto the retina via the optical system of the night vision device.

However, the Front injection technology has a drawback that a pixel by pixel fusion cannot be achieved. For example, according to U.S. Pat. No. 7,842,921, a turning element is disposed in front of the objective lens of the night vision device, whereby a picture-in-picture is formed in the field of view of the night vision. Therefore, a portion of the field of view of the night vision will be blocked, which may form an image like FIG. 1. Since the size of the infrared image is different from the size of the visible image, these two images become not clear if they are put together. Additionally, a part of the night vision device needs to be dismantled, and installation of other components is required, which requires a substantial transformation of the night vision device, and increases the size and the cost of the night vision device. So this method is not practical.

Hence, how to provide an easy pixel by pixel optical fusion system and method capable of solving the above mentioned problems has become an important topic for the person skilled in the art.

SUMMARY OF THE INVENTION

In view of the above-mentioned problems, optical fusion systems are provided in the present disclosure, which can perform a pixel by pixel fusion on images from night vision and thermal imager more efficient without blocking each other.

It is one objective of the present disclosure to provide infrared and night vision pixel by pixel optical fusion systems.

Two infrared and night vision pixel by pixel optical fusion systems are provided. The first infrared and night vision pixel by pixel optical fusion system is to add a common-aperture beam splitter in front of the night vision device, which is a band-pass filter having a high transmission for the night vision light with a wavelength of 0.78-1 µm, and a high reflectivity for the visible light with a wavelength of 0.38-0.78 µm and for the infrared light with a wavelength of 8-14 µm. The common-aperture beam splitter is used for reflecting the visible light and the infrared light to the infrared imaging channel, and a long-pass filter is used for filtering off the visible light and only the infrared light with a wavelength of 8-14 µm will be imaged to a focal plane array (FPA) detector. After electrical processing, a target image with a temperature higher than a certain threshold (such as, 35° C.) is obtained on the LCD display, which is projected onto the back surface of the beam splitter and then reflected to an objective lens of the night vision device, and the reflected target image together with a night vision image form an image in a photomultiplier tube to enter the same night vision system. Finally, the pixel by pixel optical fusion image is displayed on the retina.

The second infrared and night vision pixel by pixel optical fusion system is to align the night vision objective lens and the infrared objective lens having the same field of view side by side. The night vision device forms an image at a certain position in front of a steering reflective mirror in front of an eyepiece, and then forms an image from the eyepiece to the retina. The infrared image on the LCD display is placed on a symmetrical position that is vertical to (an angle of 90 degrees) the night vision image, and the reflective mirror is replaced by a beam splitter, which is used for reflecting a green night vision image having a peak value of 0.55 µm. It passes through other wavelengths of visible lights from the LCD display of the infrared image, and then the eyepiece is used for performing pixel by pixel image fusion on the retina, the position of the LCD display can be adjusted in order to correct the difference due to the side-by-side alignment of these two objective lens. Since only infrared targets having a temperature above or below a certain threshold are used in the present disclosure, such as humans, animals and vehicles together with pseudo-color, the white or red humans, animals and vehicles can be clearly seen in a green night vision background with high contrast no matter which scheme is adopted.

Since the ambient temperature is higher than the human temperature in a desert or in a hot summer day, the infrared image only displays the targets (such as, human and animals) having a temperature lower than 38° C. If the high-temperature background is not removed from the infrared image, the human and animals will be submerged in the high-temperature background and are almost impossible to be seen, so to setup a threshold is important.

The obvious advantages of the present disclosure are that: for the first scheme, only a beam splitter is added in front of the night vision device, and no modifications are made to the night vision device and the infrared thermal imager themselves. That is to say, only the images displayed by the LCD display are projected to the back surface of the beam splitter, and a pixel by pixel fusion is performed on the infrared image and the night vision image. For the second scheme, only the reflective mirror in front of the eyepiece of the night vision device is replaced by a beam splitter having the same size, and no modifications are made to the night vision device and the infrared thermal imager themselves. No matter which scheme is adopted, the field of views of the night vision device and the infrared thermal imager are not blocked by each other, which can really implement a pixel by pixel fusion rather than a picture-in-picture fusion. Since a threshold is set to the infrared image, the infrared image can be clearly seen in the night vision image no matter it's in a high-temperature background or in a low-temperature background or no matter it's in a day background or a night background. This kind of fusion system and method is simple, inexpensive, and small-sized, and has low power consumption.

These and other objectives of the present disclosure will no doubt become obvious to those of ordinary skill in the art after reading the following detailed description of the preferred embodiment that is illustrated in the various figures and drawings.

DESCRIPTION OF THE PREFERRED EMBODIMENTS

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Figure 1:
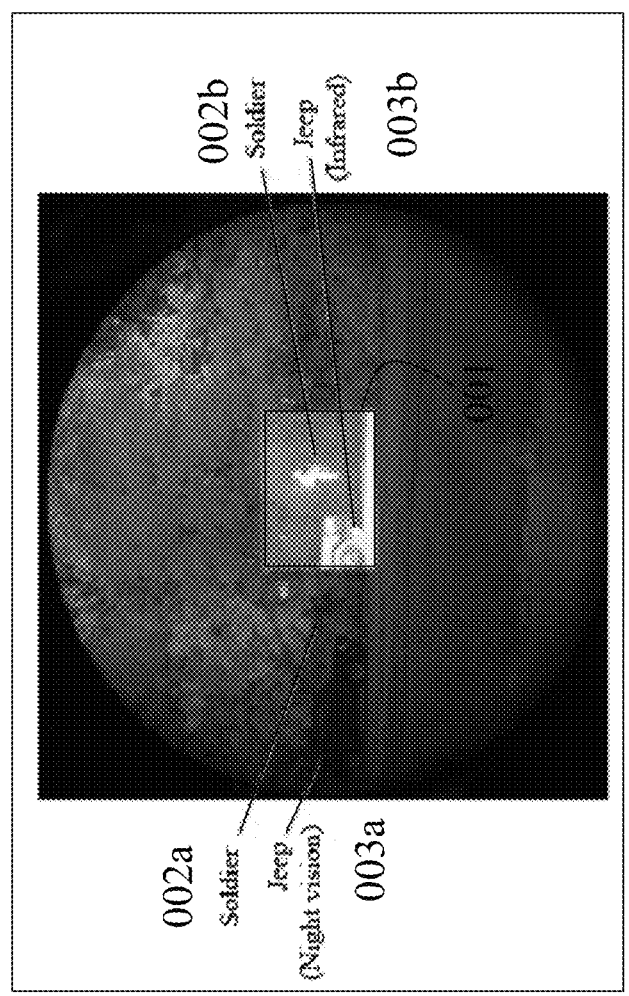
FIG. 1 is a schematic diagram showing a picture-in-picture image displayed by a night vision device and an infrared thermal imager.
Figure 2:
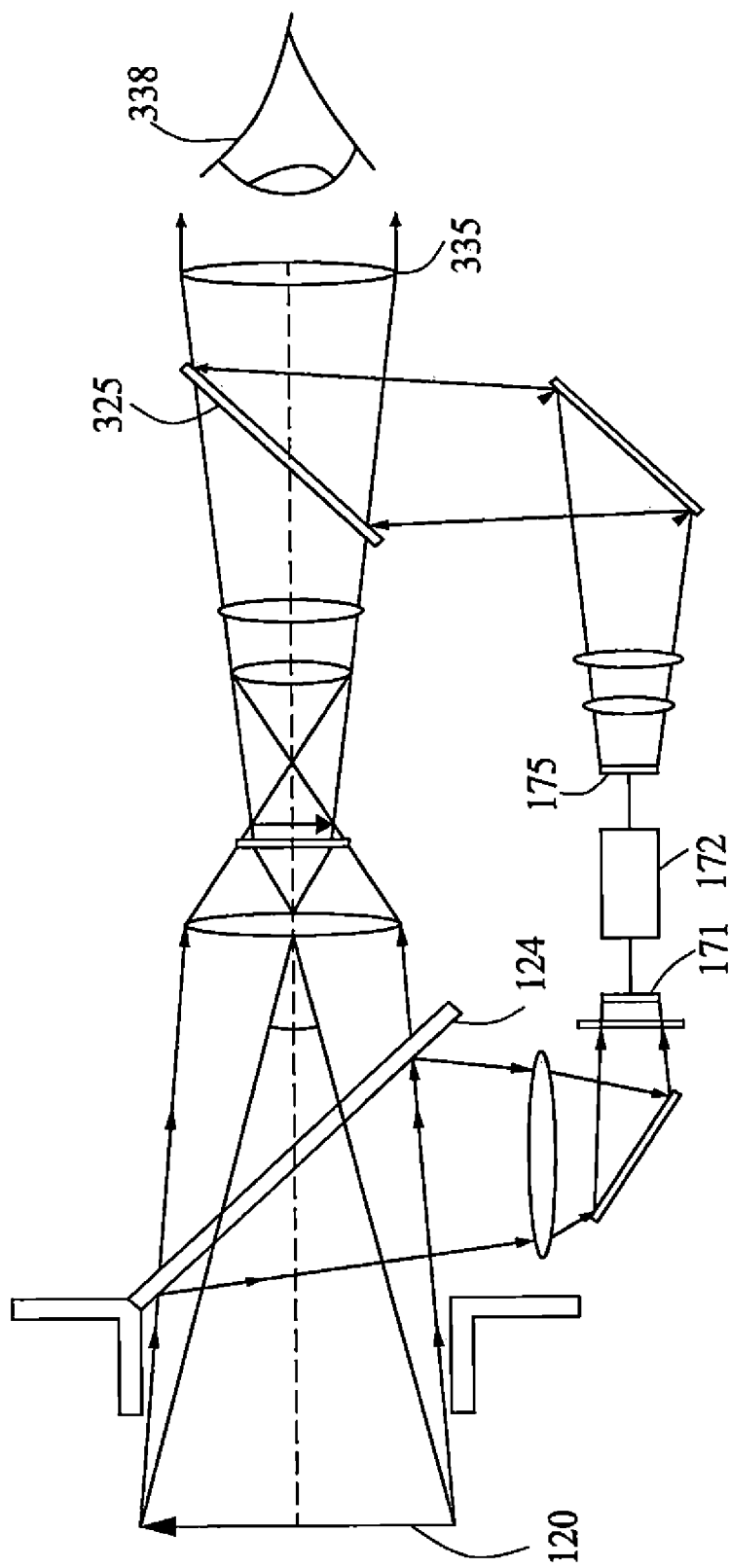
FIG. 2 is a diagram showing a back-end fusion scheme.
Figure 3:
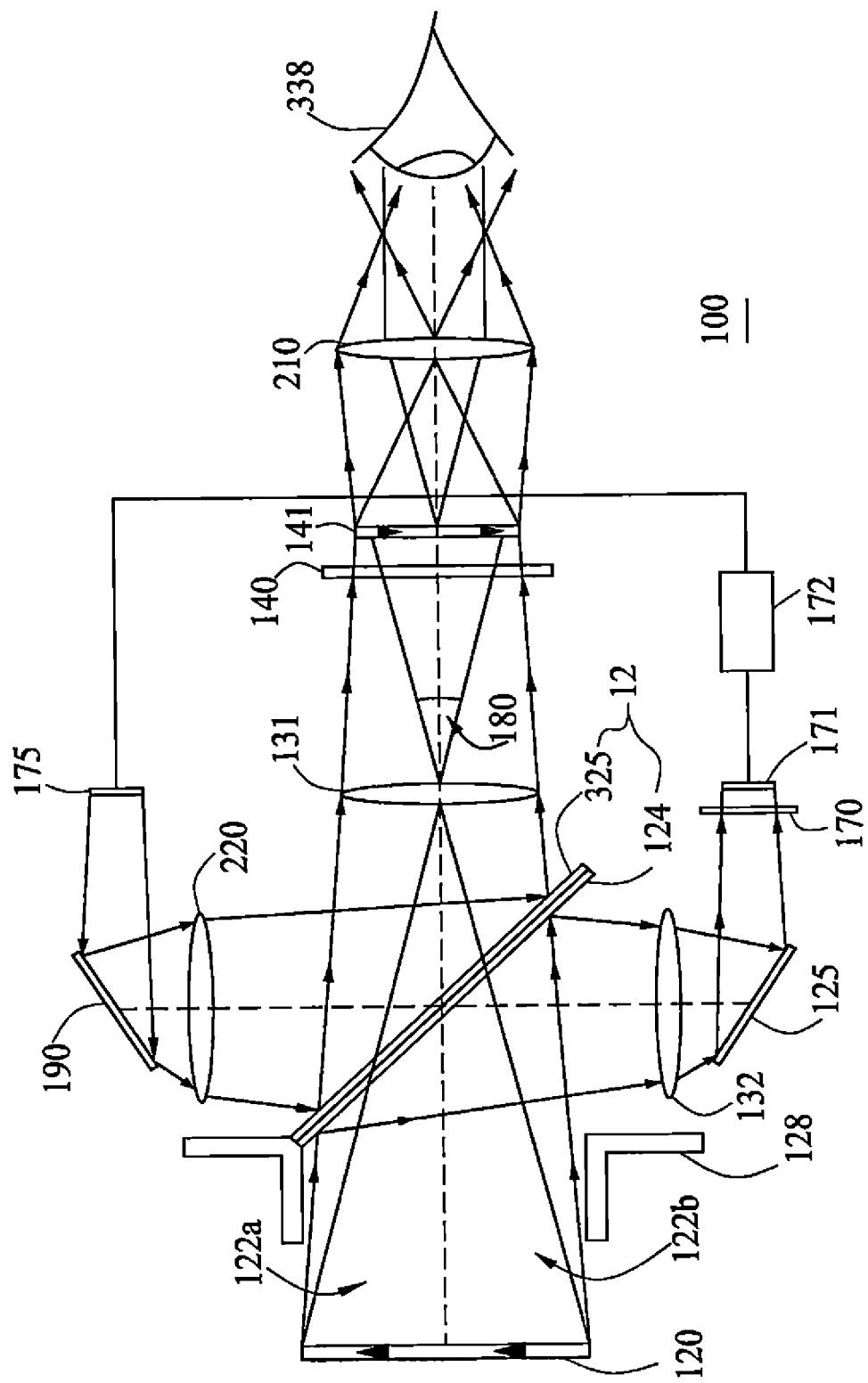
FIG. 3 is a block diagram of a pixel by pixel optical fusion system according to a first embodiment of the present disclosure.

A first fusion scheme of the present disclosure is a front-end fusion scheme. As shown in FIG. 3, FIG. 3 is a block diagram of a pixel by pixel optical fusion system 100 according to a first embodiment of the present disclosure. The pixel by pixel optical fusion system 100 is adapted to display a target object 120, that is to say, a night vision device and an infrared thermal imager are used for displaying the image of the target object 120.

The pixel by pixel optical fusion system 100 may include a common-aperture beam splitter 12, wherein the common-aperture beam splitter 12 includes a first surface 124 and a second surface 325, and the first surface 124 and the second surface 325 are located on both sides of the common-aperture beam splitter 12, respectively.

The common-aperture beam splitter 12 is used for receiving the lights from the target object 120, which include an infrared light 122a and a night vision light 122b. The infrared light 122a and the night vision light 122b are confined in the same light bar having the same field of view, which is in contact with the common-aperture beam splitter 12. If the infrared light 122a and the night vision light 122b have the same field of view, it's ensured that the target object 120 having the same size can be seen. The common-aperture beam splitter 12 is a band-pass filter, which has a high transmission for the near infrared light with a wavelength of 0.78-1 µm sensitive to the night vision device, and a high reflectivity for the visible light with a wavelength of 0.38-0.78 µm and for the far infrared light with a wavelength of 8-14 µm sensitive to the infrared imager. The visible light and the infrared light are reflected by the first surface 124 of the common-aperture beam splitter 12 to an infrared objective lens 132, the lights are reflected by a steering reflective mirror 125, and then a long pass filter 170 is used for filtering out the visible light for imaging the infrared light to a focal plane array (FPA) detector 171.

The focal plane array detector 171 is used for receiving the infrared light 122a reflected from the first surface 124 of the beam splitter. A processing unit 172 is connected to the focal plane array detector 171, and the processing unit 172 is used for processing the infrared light 122a to generate an electronic image. A display 175 is connected to the other end of the processing unit 172, wherein the display 175 is used for displaying the electronic image processed by the processing unit 172 in order to transform the electronic image into a visible optical image which is projected onto the back side 325 of the common-aperture beam splitter 12. In this embodiment, the display 175 may be an LCD display or an OLED display, and the LCD/OLED display is used for displaying an image which transforms the infrared light with threshold into a visible light.

The image is in contact with a second steering reflective mirror 190 first, wherein the second steering reflective mirror 190 is disposed between the display 175 and the common-aperture beam splitter 12, and the second steering reflective mirror 190 is used for reflecting the image to the second surface 325 of the common-aperture beam splitter 12. The image will also pass through a relay lens 220, which is disposed between the common-aperture beam splitter 12 and the second steering reflective mirror 190.

When the infrared image converted into the visible lights is in contact with the common-aperture beam splitter 12, they are almost entirely reflected by the second surface 325 and are fused with the light (the night vision light 122b) passing through the common-aperture beam splitter 12 to be projected onto the objective lens 131 together. Both the infrared light 122a and the night vision light 122b see the target object 120 from the same field of view 180, wherein the objective lens 131 is disposed between the common-aperture beam splitter 12 and the retina 338. After the infrared light 122a and the night vision light 122b from the target object 120 are filtered by a filter 140 capable of passing through visible lights and near infrared light, the stray lights of other wavelengths are filtered out and the filtered lights are imaged onto the photomultiplier tube 141, and then a pixel by pixel optical fusion imaging is performed onto the retina 338 by using the eyepiece 210. The filter 140 is disposed between the objective lens 131 and the retina 338, and the photomultiplier tube 141 is disposed between the filter 140 and the eyepiece 210.

Since the infrared light 122a will form an image on a photomultiplier tube 141 having a high gain through the display 175, a very weak infrared signal can be detected through the photomultiplier tube 141. Certainly, since a threshold is set to the infrared image, only the infrared target object having a temperature higher than the threshold (such as, human, animals, and vehicles) can be appeared in a clear starlight background.

Figure 4:
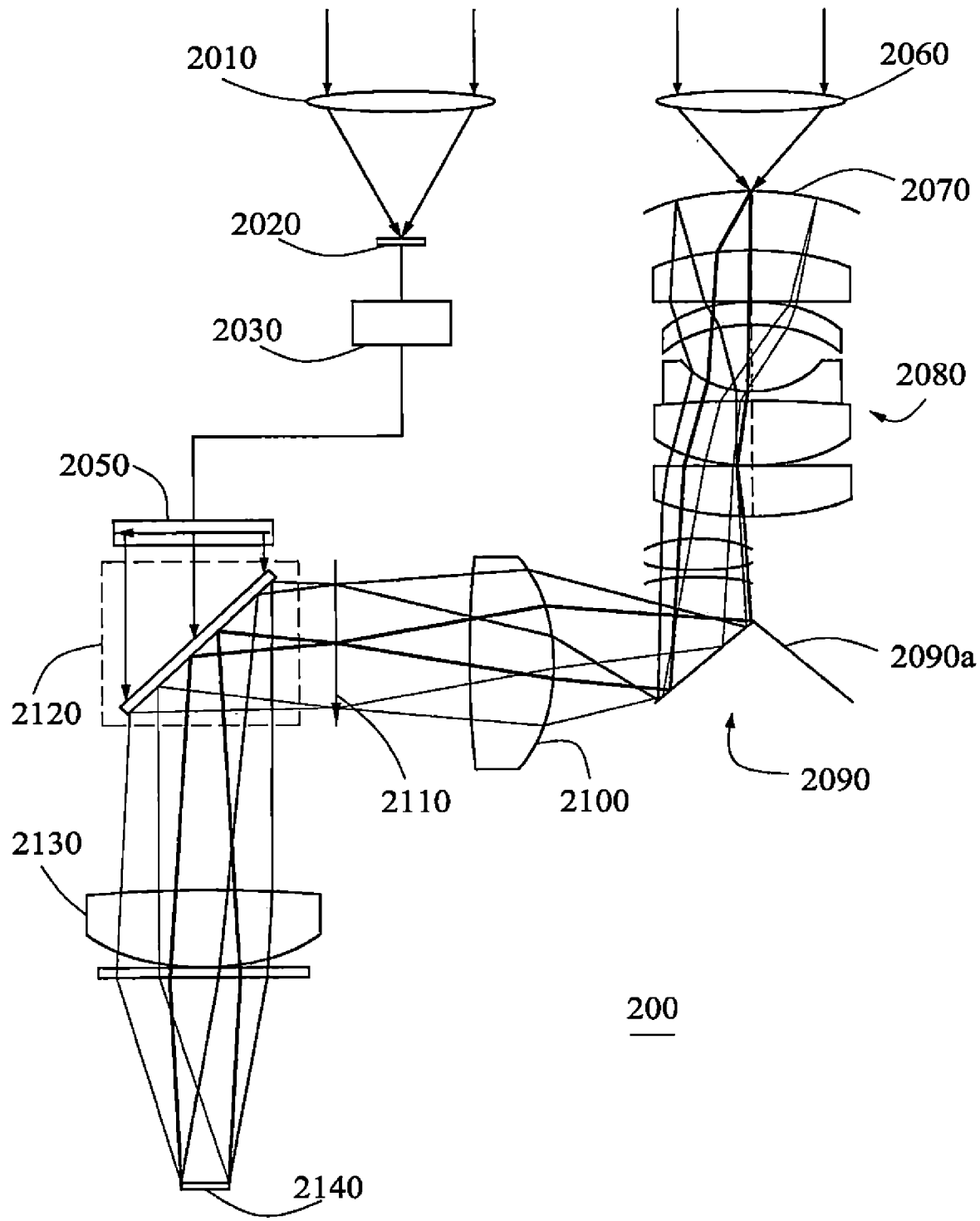
FIG. 4 is a block diagram of a pixel by pixel optical fusion system according to a second embodiment of the present disclosure.

Please refer to FIG. 4. FIG. 4 is a block diagram of a pixel by pixel optical fusion system 200 according to a second embodiment of the present disclosure. In this embodiment, the pixel by pixel optical fusion system 200 adopts a back-end fusion scheme. The infrared objective lens 2010 and the night vision objective lens 2060 having the same field of view are aligned side by side for receiving the far infrared light and the near infrared light from the same target object. The night vision objective lens 2060 forms an image of the target object onto a photomultiplier tube 2070, and then it's imaged to a certain position 2110 via a complex relay optical system 2080, 2090, and 2100. The infrared objective lens 2010 forms an image of the target object onto an infrared focal plane array detector 2020, and then the infrared electronic image is transformed into a visible optical image via a circuit board 2030 to be displayed on an LCD screen 2040 of a display 2050. The LCD screen 2040 is placed on a strictly-symmetrical position that is vertical to (an angle of 90 degrees) the certain position 2110. The infrared image is interpolated, scaled, contrast enhanced, rotated, translated, etc. by the processor 2030, such that the processed infrared image is exactly as large as the night vision image and a pixel by pixel image fusion can be performed on the processed infrared image and the night vision image. For a conventional night vision device, the mirror 2120 is implemented by a steering reflective mirror. In order to perform the fusion, the mirror 2120 is replaced by a beam splitter having the same size in the present disclosure. The beam splitter reflects the narrowband green light having a center wavelength of 0.55 µm from the photomultiplier tube, and passes through the visible light having a wavelength of 0.38-0.78 µm from the LCD, and thus no matter the green light (from the night vision device) or the visible light (from the infrared thermal imager) have a high penetration rate. Finally, the pixel by pixel optical fusion image is formed onto the retina 2140 via the eyepiece 2130. Only a reflective mirror is replaced by a beam splitter having the same size in this back-end fusion system, and no modification is made to the night vision device and the infrared thermal imager.

In this embodiment, the beam splitter 2120 is used for replacing a known reflective mirror, which eliminates the need for additional insertion of the beam splitter and further overcomes the problem of limited interior space of known night vision devices. Since only the infrared targets having a temperature above a threshold (such as, vehicles, humans and animals having a temperature of 35-40° C.) can be embedded in the clear night vision background image, so that red (pseudo-color) humans or animals can be seen in the green fields and forests, which will be very helpful for night war and hunting.

Figure 5:
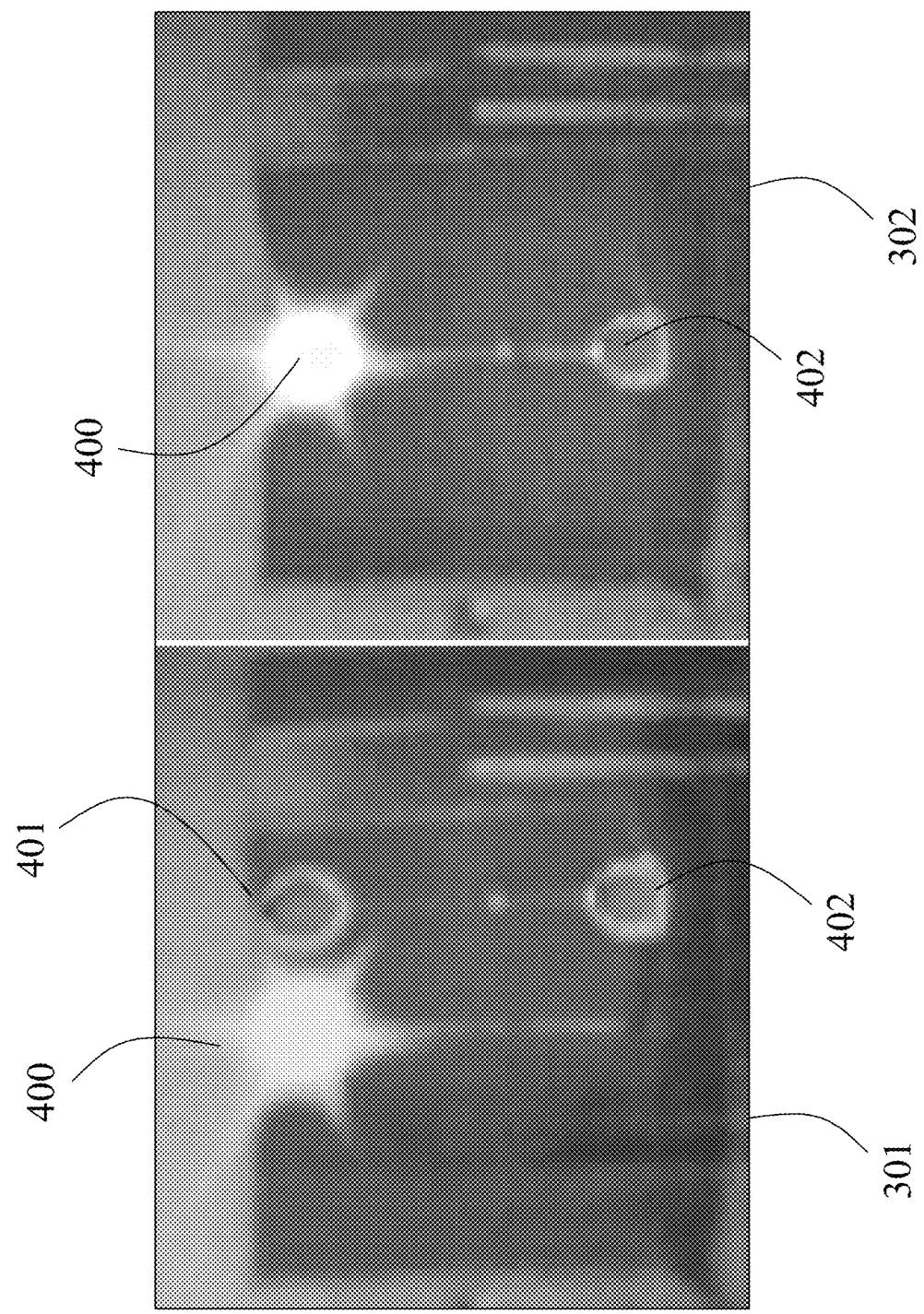
FIG. 5 is a diagram showing a comparison between a lamp image before fusion and after fusion.

Please refer to FIG. 5. FIG. 5 is a diagram showing a comparison between a lamp image before performing a pixel by pixel fusion and after performing a pixel by pixel fusion. The left sub-figure 301 is an image displayed before performing a fusion. As can been seen from the left sub-figure 301, the white light 400 (left) emitted by the lamp and the infrared thermal image 401 (right) without the white light can be seen. The night vision device cannot see the transformer 402 at night, but the infrared thermal imager can clearly see the transformer 402 having a temperature higher than the lamp. After a fusion is performed by the optical fusion systems 100 or 200 of the present disclosure, an image after fusion like the right sub-figure 302 is obtained. Since a threshold is set to the infrared image, only the transformer 402 is displayed without showing the lamp. Therefore, the white light 400 of the lamp from the night vision device and the hot transformer 402 from the infrared thermal imager can be seen in the right sub-figure 302 after performing the pixel by pixel optical fusion. An optical fusion system without setting a threshold cannot obtain the same effect as the present disclosure.

Reference in the specification to "one example" or "an example" means that a particular feature, structure, or characteristic described in connection with the example is included in at least an implementation. The appearances of the phrase "in one example" in various places in the specification are not necessarily all referring to the same example. Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The above are only preferred examples of the present disclosure is not intended to limit the present disclosure within the spirit and principles of the present disclosure, any changes made, equivalent replacement, or improvement in the protection of the present disclosure should contain within the range.

Those skilled in the art will readily observe that numerous modifications and alterations of the device and method may be made while retaining the teachings of the invention. Accordingly, the above disclosure should be construed as limited only by the meters and bounds of the appended claims.

What is claimed is:

1. An infrared and night vision pixel by pixel optical fusion system, comprising:
   an infrared thermal imager;
   a night vision device; and
   a common-aperture beam splitter, placed in front of the night vision device, which is a band-pass filter having a high transmission for a night vision light sensitive to the night vision device, and a high reflectivity for a visible light and for an infrared light;
   wherein lights emitted by a target object comprise the infrared light and the night vision light;
   wherein after electrical processing, a target image with a temperature higher or lower than a certain threshold is obtained on an LCD display or an OLED display;
   wherein the infrared image on the LCD/OLED display converted into the visible light is projected onto the back surface of the beam splitter by the relay lens, and after the projected target image together with the night vision light from the same target object enter the night vision system, a pixel by pixel fusion is performed in order to form an image on a retina.

2. The infrared and night vision pixel by pixel optical fusion system according to claim 1, wherein the common-aperture beam splitter is a band-pass filter having a high transmission for the night vision light with a wavelength of 0.78-1 µm sensitive to the night vision device, and a high reflectivity for the visible light with a wavelength of 0.38-0.78 µm and for the infrared light with a wavelength of 8-14 µm.

3. The infrared and night vision pixel by pixel optical fusion system according to claim 1, wherein the common-aperture beam splitter is used for reflecting the visible light and the infrared light to an infrared imaging channel, and the optical fusion system further comprises a long-pass filter used for filtering out the visible light for imaging the infrared to a focal plane array detector.

4. The infrared and night vision pixel by pixel optical fusion system according to claim 1, wherein the infrared light and the night vision light have the same field of view, and it's ensured that the same target with the same size is seen through a light bar and a beam splitter, such that a pixel by pixel fusion is performed.

5. The infrared and night vision pixel by pixel optical fusion system according to claim 1, wherein only infrared targets having a temperature above or below a certain threshold are reserved for performing a pixel by pixel fusion with the night vision light.

\* \* \* \* \*